United States Patent [19]

Buckland

[11] Patent Number: 4,744,081
[45] Date of Patent: May 10, 1988

[54] FRAME FIND CIRCUIT AND METHOD

[75] Inventor: Kenneth M. Buckland, Ottawa, Canada

[73] Assignee: Northern Telecom Limited, Montreal, Canada

[21] Appl. No.: 50,658

[22] Filed: May 18, 1987

[51] Int. Cl.⁴ .................................................. H04J 3/06
[52] U.S. Cl. ..................................... 370/100; 375/114
[58] Field of Search ....................... 375/113, 114, 116; 371/42, 47; 370/100, 105, 106

[56] References Cited

U.S. PATENT DOCUMENTS

| 4,002,845 | 1/1977 | Kaul et al. | 370/100 |
| 4,414,662 | 11/1983 | Bousquet | 370/100 |
| 4,541,104 | 9/1985 | Hirosaki | 375/114 |
| 4,596,981 | 6/1986 | Ueno et al. | 375/113 |
| 4,651,319 | 3/1987 | Bowlds | 370/112 |
| 4,674,087 | 6/1987 | Green | 370/100 |
| 4,674,088 | 6/1987 | Grover | 375/116 |
| 4,680,766 | 7/1987 | Wilkinson | 371/47 |

Primary Examiner—Benedict V. Safourek
Assistant Examiner—Stephen Chin
Attorney, Agent, or Firm—R. John Haley

[57] ABSTRACT

A frame word in a word-interleaved multiplexed serial data stream is detected by latching a word from the data stream and comparing it with the frame word. If there is a match, latching of consecutive words continues for at least one frame to check for the frame word in the next frame. If the compared words do not match, then a bit slip is effected so that the next word latched and compared has a different bit orientation from the preceding word, whereby in one frame words with various different bit orientations are examined for the presence of the frame word, and all possible bit orientations of the words are checked over a number of frames. The arrangement eliminates the need for one counter in the frame find circuit and simplifies its control circuitry.

14 Claims, 2 Drawing Sheets

4,744,081

FRAME FIND CIRCUIT AND METHOD

This invention relates to a method of and a frame find circuit for detecting a frame word in a multiplexed serial data stream.

It is well known to multiplex data in time division multiplex frames to produce a serial data stream. Various frame formats are known for such multiplexed data, all of which provide some means for determining the frame boundaries in the serial data stream. In one frame format described, for example, in Graves et al. U.S. patent application No. 797,264 filed Nov. 12, 1985 and entitled "Method of Multiplexing Digital Signals", each frame comprises interleaved words each of a predetermined number of consecutive bits, one of the words being a predetermined frame word which has a fixed position in the frame and hence from which the frame boundaries can be determined. This invention is particularly concerned with a frame find circuit and method for use with such a frame format.

As described in further detail below, known frame find circuits for detecting the frame word in such a frame format include a so-called slide counter, which is incremented with each word which is found not to correspond to the frame word until it reaches a maximum count equal to the number of words in the frame. Then a bit slip is performed to enable checking of words formed with a different bit orientation. An object of this invention is to provide a simplified frame find circuit in which the need for a slide counter is obviated.

According to one aspect of this invention there is provided a method of detecting a frame word in a multiplexed serial data stream, comprising word-interleaved frames each comprising n words each of m consecutive bits, where n and m are integers, comprising the steps of: monitoring groups each of m consecutive bits of the data stream thereby to detect the frame word; and controlling the relative displacement of the successive monitored groups of m consecutive bits in dependence upon detection of the frame word, said relative displacement being m bits for at least one frame following detection of the frame word, and otherwise being a predetermined displacement of p bits, where p is a plural integer which is not an integral multiple of m; wherein m, n, and p are such that the lowest common multiple of p and the integer remainder of mn/p is the product of p and said remainder.

According to another aspect of the invention there is provided a frame find circuit for detecting a frame word in a multiplexed serial data stream, comprising word-interleaved frames each comprising n words each of m consecutive bits, the circuit comprising: storage means for storing from the data stream a group of m consecutive bits; comparison means for detecting the frame word in the bits stored in the storage means; and control means for controlling in dependence upon such detection the displacement in the data stream of groups of m consecutive bits successively stored in the storage means, said displacement being m bits for at least n words following detection of the frame word, and otherwise being a predetermined displacement of p bits; wherein m, n, and p are plural integers, m and p have no common prime factor greater than one, and p and the integer remainder of mn/p have no common prime factor greater than one.

Preferably the storage means comprises a shift register for receiving bits of the serial data stream, latching means for latching m consecutive bits from the shift register, and frequency divider means for frequency dividing a clock signal at the bit rate of the serial data stream selectively by m or p under the control of the control means for controlling the latching of said m consecutive bits by the latching means. The circuit conveniently includes a channel counter responsive to the frequency-divided clock signal from the frequency divider means for counting the n words in each frame of the serial data signal.

The invention is based on the provision of a continuous bit slip of words in the serial data stream which are monitored for the presence of the frame word. As long as the frame word is not detected, the next word to be examined has a different bit orientation from that just examined, so that generally words with many or all possible bit orientations will be examined in a single frame. The relationships between the values of m, n, and p are such that, over a period of p frames, all words with all bit orientations are checked until the frame word is detected.

To facilitate control of the frequency dividing means, conveniently there is a difference of one between the values of p and m, and conveniently $p = m + 1$. It is also convenient for the integer remainder of mn/p to be one. In an embodiment of the invention described below, $m = 8$, $p = 9$, and $n = 512$.

The invention will be further understood from the following description with reference to the accompanying drawings, in which.

Figure 1:
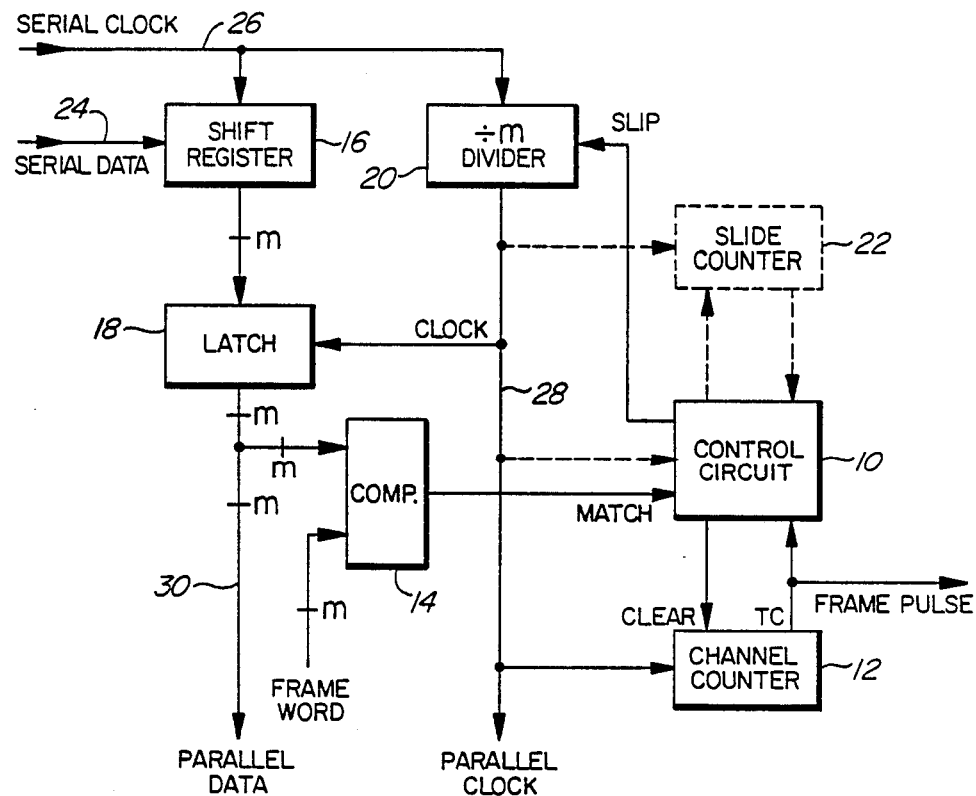
FIG. 1 illustrates a frame find circuit in accordance with an embodiment of the invention, also illustrating in broken lines a slide counter of prior art frame find circuits which is dispensed with by the present invention.

Referring to FIG. 1, the frame find circuit illustrated therein comprises a control circuit 10, a channel counter 12, a frame word comparator 14, a shift register 16, a latch 18, and a divide-by-m divider 20. A frame find circuit in accordance with the prior art would also include a slide counter 22, which is shown in broken lines in FIG. 1 but which is dispensed with in frame find circuits operating in accordance with the invention.

In operation of a prior art frame find circuit, serial data bits incoming on a line 24 are clocked into the shift register 16 under the control of a serial clock signal, recovered from the data in known manner, on a line 26. It is assumed that the serial data bits comprise time division multiplexed m-bit words of data, with the words interleaved one after another in tdm frames and with the m bits of each word being consecutive in the serial data stream, one of which words in each frame is a synchronizing or frame word which is to be detected. Such a frame format is described, for example, in Graves et al. U.S. patent application No. 797,264 already referred to.

The serial clock signal is also supplied to the divider 20 which, in the absence of a signal SLIP supplied from the control circuit 10, frequency-divides the clock signal by the factor m to produce a clock signal on a line 28, under the control of which m-bit words from the shift register 16 are latched in the latch 18. The comparator 14 compares each latched word with the m-bit frame word which is to be detected, and in the event that the compared words are the same supplies a signal MATCH to the control circuit 10. The control circuit 10 consequently clears the channel counter 12 with a signal CLEAR, and in the event that frame synchronization has been established a valid frame pulse is produced when the channel counter 12, clocked from the line 28, reaches its top count TC, corresponding to the number of channels (or words) in each frame. The m-bit parallel data words are then derived from the output of the latch 18 via lines 30, and a corresponding parallel data clock signal is derived from the line 28.

As the frame word may occur in the data words themselves, and as the latching of words in the latch 18 must be synchronized to the word boundaries in the serial data stream, it is necessary for the frame word to be matched in at least two successive frames before frame synchronization can be reliably established. In the event that the frame word is detected in one frame but not in the next frame, a step or slide is made to the next word in a continuing search for the frame word.

With each failure to detect the frame word in a particular word of the data stream, the control circuit 10 enables the slide counter 22 to be incremented by the clock signal on the line 28. In the event that the slide counter 22 reaches its top count, also equal to the number n of channels or words in each frame, then the circuit has failed to detect the frame word in any of the words with the prevailing bit orientation. In this case the slide counter 22 is reset and the control circuit 10 supplies the signal SLIP to the divider 20 to cause the divider to slip by one pulse of the serial clock on the line 26; i.e. to divide by $m-1$ or $m+1$ for one division cycle. Consequently the words latched in the latch 18 are offset by one bit from their previous orientation, and frame finding continues in the above-described manner with this new bit orientation of the data words. The word sliding with each failure to detect the frame word, and the bit slipping each time the slide counter 22 reaches its top count, continue until the frame word is reliably detected.

In a frame find circuit in accordance with this invention, the slide counter 22 of the prior art as described above is dispensed with, and the control circuit 10 is consequently simplified, by modifying the manner in which searching for the frame word is effected. In such a frame find circuit the parts shown in broken lines in FIG. 1 are omitted, and the control circuit 10 can have the form shown in FIG. 2. The operation of the frame find circuit is described below with reference to FIG. 3.

Figure 2:
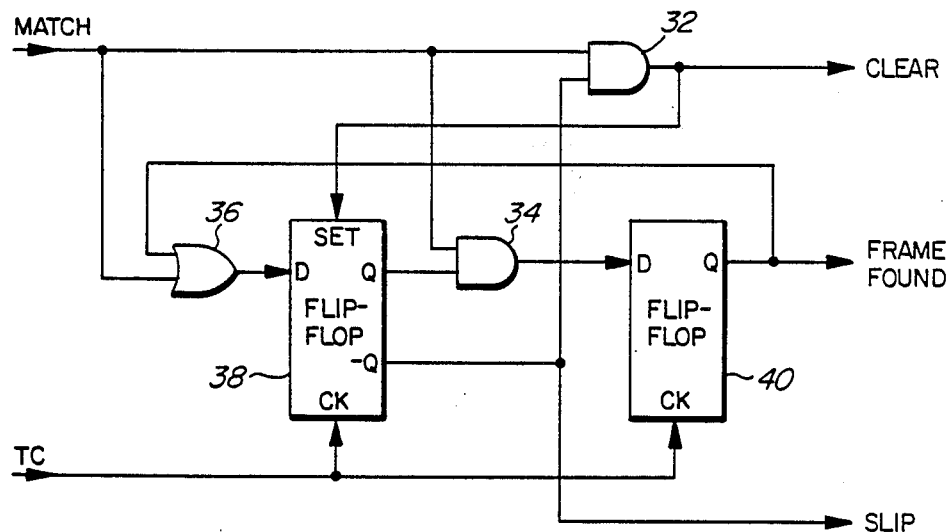
FIG. 2 illustrates one form of control circuit which may be used in the frame find circuit of FIG. 1.

Referring to FIG. 2, the control circuit 10 comprises two two-input AND gates 32 and 34, a two-input OR gate 36, and two D-type flip-flops 38 and 40 each having a data input D, a clock input CK, and an output Q. The flip-flop 38 also has a complementary output $-Q$ and a set input SET.

The frame find circuit operates in the same manner as that described above, except that whenever a frame word is not detected the control circuit 10 produces the signal SLIP, so that the bit orientation of words in which the frame word is being sought can change continuously throughout a frame.

Figure 3:
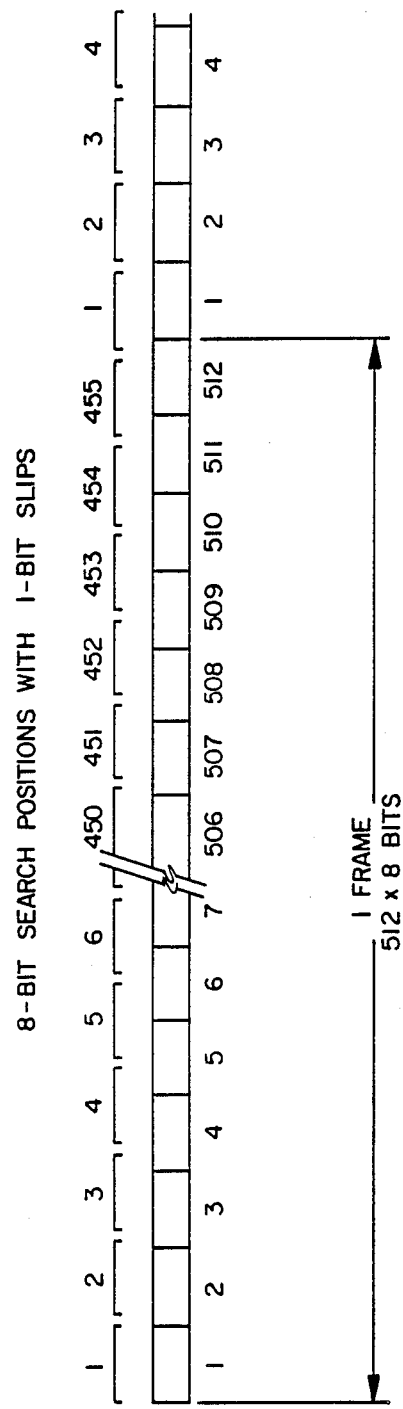
FIG. 3 is a frame format diagram with reference to which the operation of the frame find circuit of FIG. 1 is explained.

By way of example, FIG. 3 illustrates a case of a frame containing 512 8-bit words (i.e. $n=512$, $m=8$), or a total of 4096 bits, with a predetermined frame word constituting one of the words. These words are numbered 1 through 512 on the lower part of FIG. 3. On the upper part of FIG. 3, 8-bit search positions numbered 1 through 455, with 1-bit slips or gaps therebetween, are shown. Each search position represents a group of 8 consecutive bits which are examined for the presence of the frame word. As can be seen from FIG. 3, the 455 8-bit search positions and 1-bit slips (it is assumed for simplicity in FIG. 3 that there are no detections of the frame word in the search positions) constitute a total of 4095 bits, one bit less than the number of bits in the frame, whereby correspondingly numbered search positions in the successive frames are offset from one another by one bit. Consequently over a period of $p=9$ consecutive frames (again assuming no detections of the frame word) all possible word locations and bit orientations would be examined for the frame word.

At the start of a frame find operation, the flip-flops 38 and 40 are cleared so that their Q outputs are both logic 0, and the signal SLIP=1 is derived from the $-Q$ output of the flip-flop 38 to cause the divider 20 to divide by $p=m+1=9$. The comparator 14 produces the signal MATCH=1 only when it detects an identity of the word latched in the latch 18 with the frame word. Consequently, until the comparator 14 detects such an identity the flip-flops 38 and 40 remain in this state, and the divider 20 continues to provide the one-bit slips represented in FIG. 3, whereby the bit orientation of words latched in the latch 18 constantly changes.

When the comparator 14 detects an identity with the frame word, it produces the signal MATCH=1, in response to which the gate 32 produces the signal CLEAR=1 to clear or reset the channel counter 12. This signal also sets the flip-flop 38, which consequently enables the gate 34, disables the gate 32, and terminates the SLIP signal (i.e. produces the signal SLIP=0) so that the divider 20 now divides by eight. One frame later, the channel counter reaches its top count n and produces the signal TC which clocks the flip-flops 38 and 40. If at this time the signal MATCH=1 again, the gate 34 produces a logic 1 output to change the state of the flip-flop 40, and it is determined that the frame word has been correctly found. A frame found signal can be derived from the Q output of the flip-flop 40. In this case via the OR gate 36 the flip-flop 38 remains set, and in successive frames the set state of the flip-flop 40 is maintained via the gate 36, flip-flop 38, and gate 34 unless the signal MATCH=1 does not occur for two frames successively.

In the event that the initial detection of the frame word was a false detection and the signal MATCH=1 does not occur one frame later, then via the gate 36 the flip-flop 38 is reset and the signal SLIP=1 is again produced, whereby the above-described slipping search procedure resumes.

Although the embodiment of the invention described above relates to a simple one-frame confidence case, it should be appreciated that similar techniques to those known in the art may be used to provide increased confidence in the frame word detection, to modify the frame word (e.g. by toggling one bit) in different frames to reduce possible confusion with static data signal patterns, and to incorporate scrambling and descrambling functions if desired.

In the embodiment of the invention described above there is an offset in the search positions of one bit per frame, there are 512 words each having eight bits in each frame, and there is a one-bit slip each time the frame word is not detected. It should be evident that many other combinations of offset, word sizes, number of words per frame, and number of bits slipped may be used whilst still providing proper functioning of the frame find circuit.

More particularly, if the effective search width p is defined as the number m of bits per word plus the number of bits slipped each time the frame word is not detected (i.e. the effective search width is the division factor of the divider 20 with the signal SLIP=1), then the offset is equal to the remainder of the number nm of bits per frame divided by the effective search width (i.e. the number of bits per frame MOD effective search width). Then for proper functioning of the frame find circuit it is necessary for the lowest common multiple of the offset and the effective search width to be their product; i.e. for the offset and the effective search width to have no common prime factors greater than one. The effective search width p is also the number of frames which must be searched for all bit orientations of all words to be checked (nine in the above embodiment).

It should also be appreciated that the effective search width p may be less than m; for example p may be selected to be equal to m−1. The value of p may be further decreased, and in a limiting situation p=1 which would correspond to operation of the frame find circuit at the serial data rate. For high speed data, such as is transmitted via optical transmission paths, for which the frame find circuit of this invention is intended, operation of the circuit, and especially of the comparator 14, is impractical in view of the operating speed limitations of the components which may be used. Thus the invention is directed to situations in which the frame find circuit operates at a speed which is less than the serial data rate, and hence in which p is a plural integer, but p may be either less than or greater than m.

Accordingly, numerous modifications, variations, and adaptations may be made to the described embodiment without departing from the scope of the invention as defined in the claims.

What is claimed is:

1. A method of detecting a frame word in a multiplexed serial data stream, comprising word-interleaved frames each comprising n words each of m consecutive bits, where n and m are integers, comprising the steps of:

monitoring groups each of m consecutive bits of the data stream thereby to detect the frame word; and controlling the relative displacement of the successive monitored groups of m consecutive bits in dependence upon detection of the frame word, said relative displacement being m bits for at least one frame following detection of the frame word, and otherwise being a predetermined displacement of p bits, where p is a plural integer which is not an integral multiple of m;

wherein m, n, and p are such that the lowest common multiple of p and the integer remainder of mn/p is the product of p and said remainder.

2. A method as claimed in claim 1 and including the step of latching each monitored group of m consecutive bits.

3. A method as claimed in claim 1 wherein the difference between p and m is one.

4. A method as claimed in claim 3 wherein p=m+1.

5. A method as claimed in claim 1 wherein the integer remainder of mn/p is one.

6. A method as claimed in claim 1 wherein the difference between p and m is one and the integer remainder of mn/p is one.

7. A method as claimed in claim 6 wherein m=8.

8. A method as claimed in claim 6 wherein p=9.

9. A frame find circuit for detecting a frame word in a multiplexed serial data stream, comprising word-interleaved frames each comprising n words each of m consecutive bits, the circuit comprising:

storage means for storing from the data stream a group of m consecutive bits;

comparison means for detecting the frame word in the bits stored in the storage means; and control means for controlling in dependence upon such detection the displacement in the data stream of groups of m consecutive bits successively stored in the storage means, said displacement being m bits for at least n words following detection of the frame word, and otherwise being a predetermined displacement of p bits;

wherein m, n, and p are plural integers, m and p have no common prime factor greater than one, and p and the integer remainder of mn/p have no common prime factor greater than one.

10. A circuit as claimed in claim 9 wherein the storage means comprises a shift register for receiving bits of the serial data stream, latching means for latching m consecutive bits from the shift register, and frequency divider means for frequency dividing a clock signal at the bit rate of the serial data stream selectively by m or p under the control of the control means for controlling the latching of said m consecutive bits by the latching means.

11. A circuit as claimed in claim 10 and including a counter responsive to the frequency-divided clock signal from the frequency divider means for counting the n words in each frame of the serial data signal.

12. A circuit as claimed in claim 9 wherein there is a difference of one between p and m.

13. A circuit as claimed in claim 9 wherein p=m+1.

14. A circuit as claimed in claim 9 wherein the integer remainder of mn/p is one.

* * * * *